D. K. OVERHISER.
Reamer.

No. 239,056. Patented March 22, 1881.

Attest:
F. W. Howard
James A. Payne.

Inventor:
David K. Overhiser
by Geo. W. Dyer
Atty.

UNITED STATES PATENT OFFICE.

DAVID K. OVERHISER, OF WILLIAMSPORT, PENNSYLVANIA.

REAMER.

SPECIFICATION forming part of Letters Patent No. 239,056, dated March 22, 1881.

Application filed July 26, 1879.

*To all whom it may concern:*

Be it known that I, DAVID K. OVERHISER, of Williamsport, in the county of Lycoming and State of Pennsylvania, have invented a new and useful Improvement in Reamers; and I do hereby declare that the following is a full and exact description of the same, reference being had to the accompanying drawings, and to the letters of reference marked thereon.

The object I have in view is to produce a reamer for finishing the walls of holes or openings, which will have forwardly-projecting cutting-teeth for enlarging the hole to a much greater extent than heretofore at the same time that the hole is reamed, the device being also adapted to hold the chips so that they will not get between the walls of the opening and the cutting-edges of the reamer, and being further constructed so that it will retain its standard size when sharpened, will always keep itself straight in its course, and will not dodge or turn aside for either a sand-hole or a hard spot in the castings, and will also be simple and cheap in construction.

My invention therein consists, first, in providing a reamer for reaming the walls of openings with a chip chamber or pocket in its front end, and with forwardly-cutting teeth on its periphery, having beveled cutting-edges for centering the tool, the chip chamber or pocket being closed and having no outlet except at the front end of the reamer, and receiving and holding the chips made by such beveled teeth, the reamer being thereby adapted for working horizontally or upwardly to advantage, and also for reaming down into a pocket; and, further, in a reamer composed of the parts mentioned and a fluted exterior for smoothing the walls of the opening, all as fully hereinafter explained.

Figure 1:
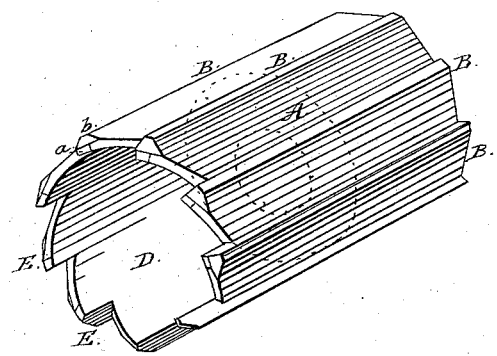
Figure 2:
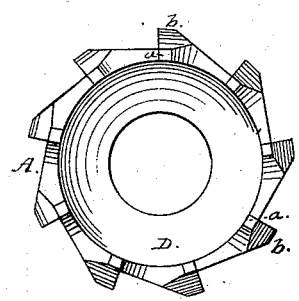
Figure 3:
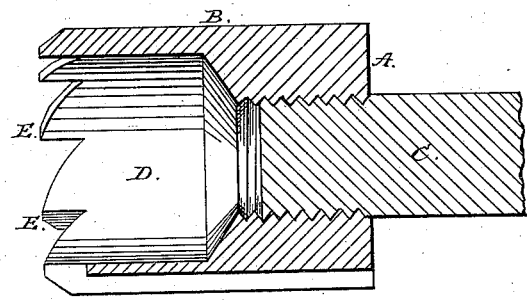

In the drawings, Figure 1 is a perspective view; Fig. 2, a front elevation; and Fig. 3 a longitudinal section, showing the same secured to a shank.

The body A of my improved reamer is of straight cylindrical form, without taper, and has extending lengthwise of its periphery flutings or ridges B, having cutting-edges to finish the walls of the hole after they are brought to proper size by the front cutters. The reamer is secured to the shank by turning the shank into a screw-threaded opening tapped in the rear end of the reamer, or by a tapered shank and tapered hole in reamer, or by other suitable means, or the reamer may be made solid and in one piece with the shank. The front end of the reamer is hollowed out to about half the depth of the reamer, more or less, as desired, forming an open and unobstructed chamber, D, which receives the chips from the front cutting-teeth, E, such teeth being formed by notching the front edge of the shell which surrounds the chamber D. These teeth E are preferably equal in number with the flutings B, being made thicker at their cutting-ends, and tapering to the bottom of the notches to correspond with the flutings. The teeth E have square and beveled cutting-ends $a$ $b$ for cutting out and enlarging the hole, while the flutings B smooth and finish the walls of the same. Whether the reamer is detachable from the shaft or cast therewith, the chip-receiving chamber will be closed except at the front end of the reamer when in use. The chips which drop or work into this chamber are retained thereby and prevented from getting between the reamer and the walls of the opening during the operation of cutting and reaming.

While I prefer to make and use the reamer as shown, and find it more effective when so constructed, yet the exterior flutings can be dispensed with and the reamer made with a smooth exterior. In that case the chip pocket or chamber and beveled cutting-teeth would act together in the same manner, the beveled teeth centering the reamer, and the chip-chamber receiving and holding the chips so that they will not have to be pushed ahead of the cutting-teeth of the reamer, as in a rose-bit, and so that the reamer can be worked down to the bottom of a pocket without first removing the tool and clearing out the chips.

The reamer after being cast is turned in a lathe or milled in a milling-machine to the required size, and when completed can be used either in a drill-press or in a lathe.

With this reamer a rough hole can be enlarged from one-fourth ($\frac{1}{4}$) to three-eighths ($\frac{3}{8}$) of an inch and finished at the same time.

The principal advantages of my reamer have already been set forth, and will be readily understood and appreciated by those versed in metal working.

What I claim as my invention, and desire to secure by Letters Patent, is—

1. A cylindrical reamer for reaming the walls of an opening, having a chip chamber or pocket in its front end, open only at its front end, and forwardly-cutting teeth with outwardly-beveled cutting-edges on its entire periphery around such chip-pocket, substantially as and for the purposes described.

2. The reamer described, consisting of the cylindrical body having exterior flutings, the chip chamber or pocket in its front end, and forwardly-projecting beveled cutting-teeth, substantially as described and shown.

This specification signed and witnessed this 11th day of July, 1879.

DAVID K. OVERHISER.

Witnesses:
ADDISON CANDOR,
R. P. ALLEN.